United States Patent
Patel et al.

(10) Patent No.: US 10,664,697 B1
(45) Date of Patent: May 26, 2020

(54) DYNAMICALLY GENERATING SYSTEM-COMPATIBLE TRANSACTION REQUESTS DERIVED FROM EXTERNAL INFORMATION

(71) Applicant: Dell Products L.P., Round Rock, TX (US)

(72) Inventors: Sitansh R. Patel, Pflugerville, TX (US); Pranay Jaiswal, Round Rock, TX (US); Ramesh Bhaskar, Austin, TX (US); Neeraj Saluja, Round Rock, TX (US); Gaurav Dongaonkar, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 15/896,478

(22) Filed: Feb. 14, 2018

(51) Int. Cl.
| | |
|---|---|
| *G06Q 20/30* | (2012.01) |
| *G06N 20/00* | (2019.01) |
| *G06K 9/00* | (2006.01) |
| *H04N 1/00* | (2006.01) |

(52) U.S. Cl.
CPC ......... *G06K 9/00469* (2013.01); *G06N 20/00* (2019.01); *G06Q 20/30* (2013.01); *G06K 2209/01* (2013.01); *H04N 1/00204* (2013.01)

(58) Field of Classification Search
None
See application file for complete search history.

(56) References Cited

U.S. PATENT DOCUMENTS

2019/0066183 A1* 2/2019 Fredrich ............... H04L 51/046

* cited by examiner

*Primary Examiner* — Idowu O Osifade
(74) *Attorney, Agent, or Firm* — Ryan, Mason & Lewis, LLP (57) ABSTRACT

Methods, apparatus, and processor-readable storage media for dynamically generating system-compatible transaction requests derived from external information are provided herein. An example computer-implemented method includes converting portions of a transaction request to items of text, wherein the transaction request is derived from a source external to a transaction request processing system; extracting items of information associated with the transaction request processing system from the items of text via one or more machine learning algorithms; dynamically generating a modified version of the transaction request based at least in part on the extracted items of information and one or more items of historical information related to the extracted items of information, wherein the modified version of the transaction request is compatible with the transaction request processing system; and outputting the modified version of the transaction request to the transaction request processing system.

20 Claims, 6 Drawing Sheets

DYNAMICALLY GENERATING SYSTEM-COMPATIBLE TRANSACTION REQUESTS DERIVED FROM EXTERNAL INFORMATION

FIELD

The field relates generally to information processing systems, and more particularly to processing information associated with transaction requests involving such systems.

BACKGROUND

Customers commonly send purchase orders (POs) for products or services via fax and email, and under conventional approaches, such POs are processed offline. However, such offline processing involves labor-intensive, time-consuming, and costly tasks, which negatively affects the customer experience and can result in delays and errors. Additionally, with conventional approaches, if an issue arises during any part of the processing, additional intervention is required, potentially leading to further delays.

SUMMARY

Illustrative embodiments of the invention provide techniques for dynamically generating system-compatible transaction requests derived from external information. An exemplary computer-implemented method can include converting one or more portions of a transaction request to one or more items of text, wherein the transaction request is derived from a source external to a transaction request processing system; extracting one or more items of information associated with the transaction request processing system from the one or more items of text via one or more machine learning algorithms; dynamically generating a modified version of the transaction request based at least in part on the one or more extracted items of information and one or more items of historical information related to the one or more extracted items of information, wherein the modified version of the transaction request is compatible with the transaction request processing system; and outputting the modified version of the transaction request to the transaction request processing system.

Illustrative embodiments can provide significant advantages relative to conventional offline processing approaches. For example, challenges associated with labor-intensive and time-consuming conventional approaches are overcome through conversion of a faxed or emailed transaction request (such as a purchase order) to an online system-compatible transaction request via optical character recognition (OCR) techniques, machine learning algorithms, and dynamic mapping of generated and stored historical information to OCR-generated inputs. Such dynamic generation of system-compatible transaction request based on external and/or offline transaction requests significantly reduces operating costs related to processing transaction requests and increases efficiency with respect to resolving transaction requests.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
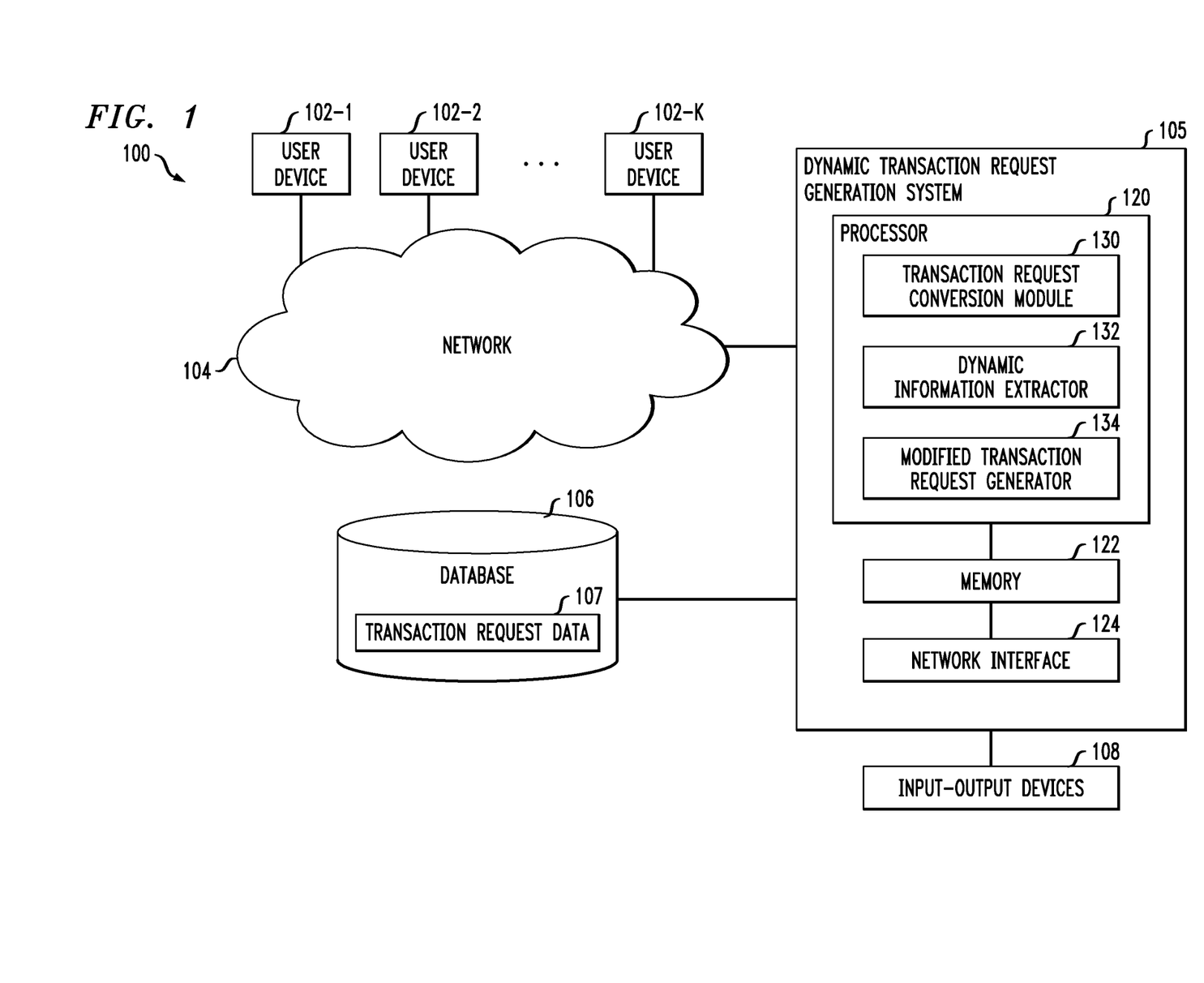
FIG. 1 shows an information processing system configured for automated processing of offline orders using machine learning in an illustrative embodiment of the invention.

FIG. 1 shows a computer network 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a dynamic transaction request generation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The dynamic transaction request generation system 105 has an associated database 106 configured to store transaction request data 107, which can include any information generated and/or stored in connection with a previous transaction request between at least one requesting/submitting entity and at least one product/service provider and/or transaction request processing system.

The database 106 in the present embodiment is implemented using one or more storage systems associated with the dynamic transaction request generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the dynamic transaction request generation system 105 are input-output devices 108, which illustratively comprise keyboards, displays or other types of input-output devices in any combination. Such input-output devices are used to support one or more user interfaces to the dynamic transaction request generation system 105, as well as to support communication between the dynamic transaction request generation system 105 and other related systems and devices not explicitly shown.

The dynamic transaction request generation system 105 in the FIG. 1 embodiment is assumed to be implemented using at least one processing device. Each such processing device generally comprises at least one processor and an associated memory, and implements one or more functional modules for controlling certain features of the dynamic transaction request generation system 105.

More particularly, the dynamic transaction request generation system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the dynamic transaction request generation system 105 to communicate over the network 104 with the user devices 102, and illustratively comprises one or more conventional transceivers.

The processor 120 further comprises a transaction request conversion module 130, a dynamic information extractor 132, and a modified transaction request generator 134.

It is to be appreciated that this particular arrangement of modules 130, 132, and 134 illustrated in the processor 120 of the FIG. 1 embodiment is presented by way of example only, and alternative arrangements can be used in other embodiments. For example, the functionality associated with the modules 130, 132, and 134 in other embodiments can be combined into a single module, or separated across a larger number of modules. As another example, multiple distinct processors can be used to implement different ones of the modules 130, 132, and 134 or portions thereof.

At least portions of the transaction request conversion module 130, dynamic information extractor 132, and modified transaction request generator 134 may be implemented at least in part in the form of software that is stored in memory 122 and executed by processor 120.

It is to be understood that the particular set of elements shown in FIG. 1 for automatically generating online-system-compatible transaction requests involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the dynamic transaction request generation system 105 can be eliminated and associated elements such as transaction request conversion module 130, dynamic information extractor 132, and modified transaction request generator 134 can be implemented elsewhere in the computer network 100.

An exemplary process utilizing transaction request conversion module 130, dynamic information extractor 132, and modified transaction request generator 134 of the dynamic transaction request generation system 105 in computer network 100 will be described in more detail with reference to the flow diagram of FIG. 5.

As detailed herein, at least one embodiment of the invention includes automatically converting an external document such as, for example, a transaction request (such as, for example, a purchase order) in the form of a portable document format (PDF)/email and/or a facsimile document into a commerce extensible markup language (cXML) format that can be processed by one or more online and/or automated transaction request processing systems (such as, for example, one or more business-to-business (B2B) systems). Additionally, during the transaction request processing process, such an embodiment can include smart-swapping of information and/or products, services, and/or systems that are unavailable, deemed end-of-life (EOL), etc. Smart-swapping of information and/or products can take place, for example, at a customer level and can be based on a unique identifier for the customer. In such an embodiment, once the customer has been recognized, a list of rules based on which components can be replaced (for instance, systems, address information, shipping information, etc.) is generated and/or presented. Such components can be, for example, contained in standing instructions from the customer as order entry instructions, which can be saved to a database and checked in real-time to replace information.

In one or more embodiments of the invention, OCR software can be utilized to extract information from PDFs, email documents, spreadsheets, etc., and such information can be processed to extract and/or determine specific types of information (including address/product information matches, etc.) relevant for processing the transaction request via an internal automated system. Such an embodiment can subsequently include converting the extracted information into a suitable format such as, for example, a standard cXML format, which can be submitted to one or more automated transaction request processing systems.

Additionally, at least one embodiment of the invention can also include enabling (for example, on a per-customer basis) a user to change information in a generated system-compatible transaction request. Such information might include, by way merely of example, billing information, stock keeping unit (SKU) information, shipping methods, customer numbers, etc.

Figure 2:
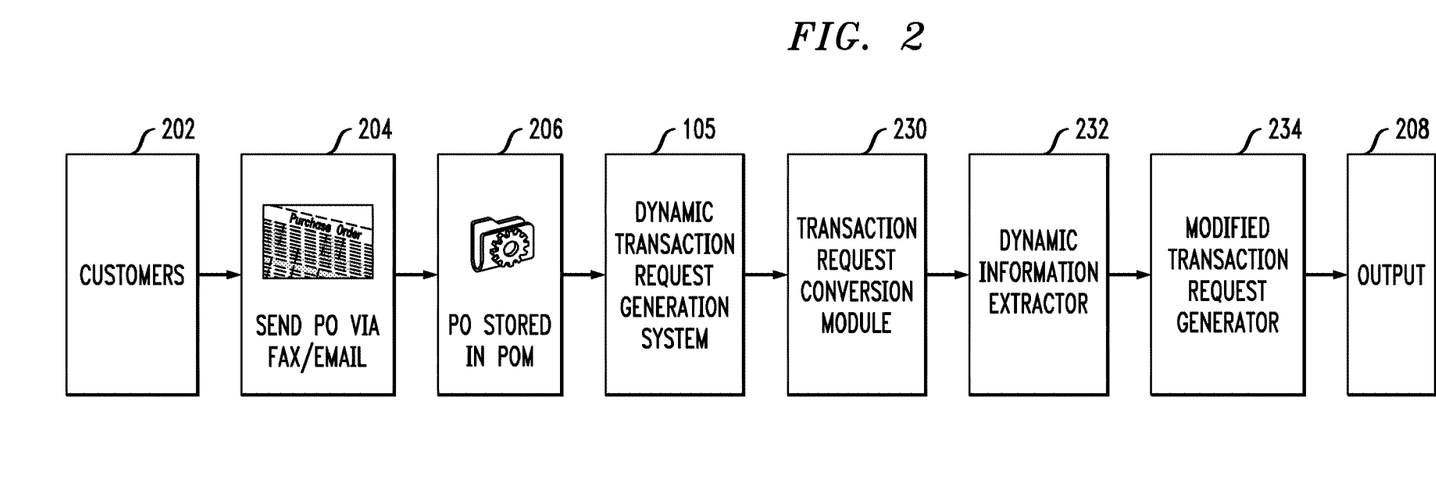
FIG. 2 shows a block diagram illustrating an example embodiment of the invention.

FIG. 2 shows a block diagram illustrating an example embodiment of the invention. By way of illustration, FIG. 2 depicts users and/or customers 202 (which can include humans and/or automated entities), which submit a PO 204 via facsimile (fax) or email. The PO 204 is then stored in a purchase order management (POM) component 206. Dynamic transaction request generation system 105 can then access the PO 204 in the POM component 206, and an example instance of transaction request conversion module 230 can then perform OCR on the PO 204, parse one or more PO details, and convert the parsed details to an XML format. Subsequently, an example instance of dynamic information extractor 232 can retrieve one or more quote details and run a PO validation. Quote details can include, for example, quote number and version, item information and quantity, price(s) quoted to the customer, shipping and billing information, payment information, shipping contacts and details, etc. A PO validation can include analyzing the generated PO information for one or more validation points such as, by way merely of example, complete PO number, customer number (if known), sales contract code covering the PO (if any), "bill to" address and phone number, a physical "ship to" address and phone number, payment type (terms, lease, credit, etc.), purchase order amount as compared to quoted price, quote number with correct product quantities and/or equipment descriptions, shipping method (carrier name, service level, account number, etc., if applicable), tax exempt number (if applicable), contact name, phone number, email address, etc., and/or end-user name, phone number, email address, program name, etc. (if applicable).

Referring again to FIG. 2, an example instance of modified transaction request generator 234 can utilize one or more machine learning algorithms to dynamically updated and/or generate a system-compatible PO based on the converted and retrieved PO details as well as the customer's historical PO information. Further, FIG. 2 depicts the output of a dynamically-generated system-compatible PO 208 for automated processing.

Figure 3:
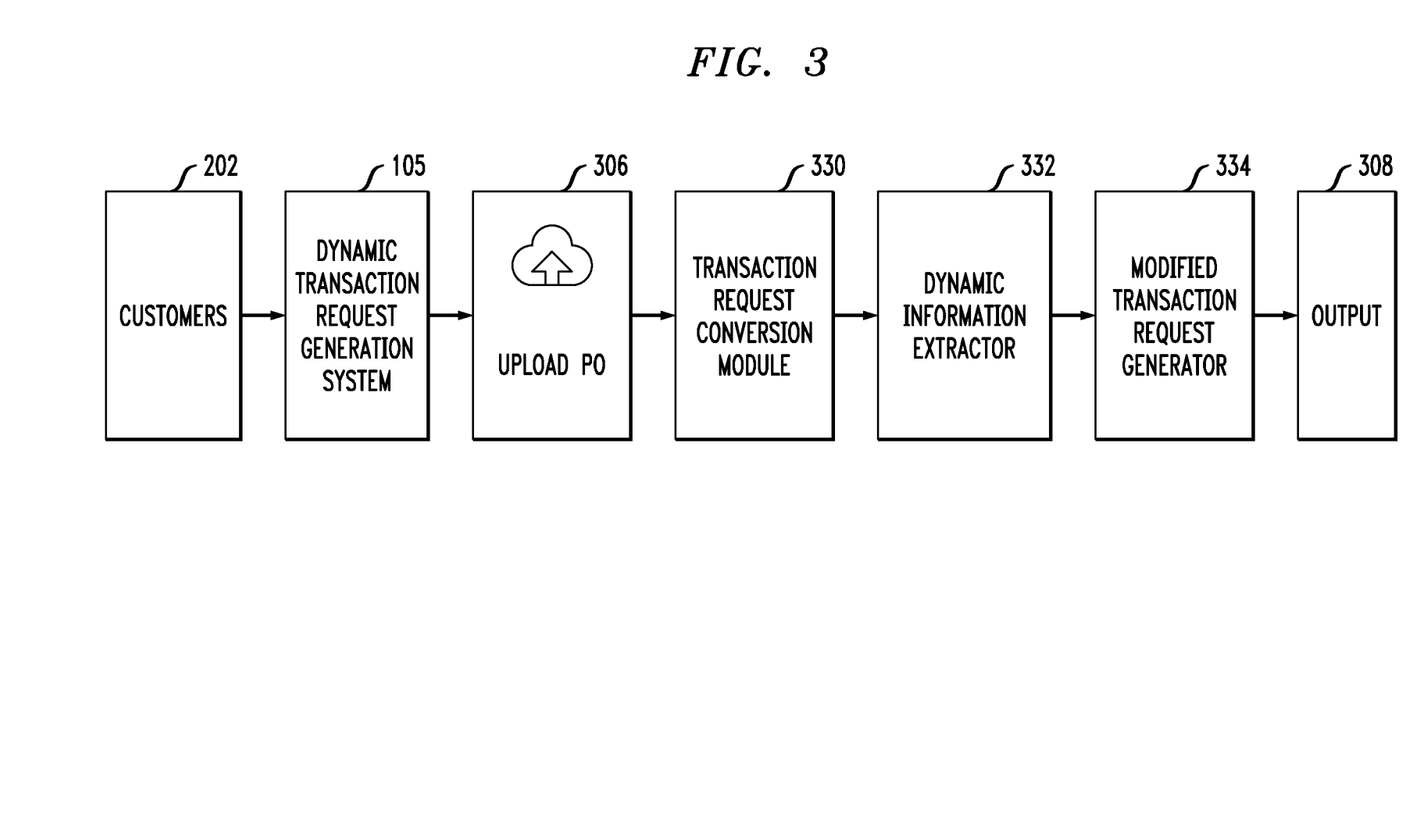
FIG. 3 shows a block diagram illustrating an example embodiment of the invention.

FIG. 3 shows a block diagram illustrating an example embodiment of the invention. By way of illustration, FIG. 3 depicts users and/or customers 202, which can submit a PO to dynamic transaction request generation system 105. In the example embodiment illustrated in FIG. 3, POs are processed by the dynamic request generation system 105. The dynamic request generation system 105 can upload the PO via one or more uploading tools 306. The POs can be uploaded automatically via e-mail, fax, and/or other offline mechanisms, uploaded by sales agents, operators, etc., or uploaded via a customer portal. An example instance of transaction request conversion module 330 can then perform a real-time OCR conversion and validation on the PO, and an example instance of dynamic information extractor 332 can prompt errors (if any) to one or more users (similar to an online experience, for example) for resolution. Subsequently, an example instance of modified transaction request generator 334 can utilize one or more machine learning algorithms to generate the output of a dynamically-generated system-compatible PO 308 for automated processing.

Figure 4:
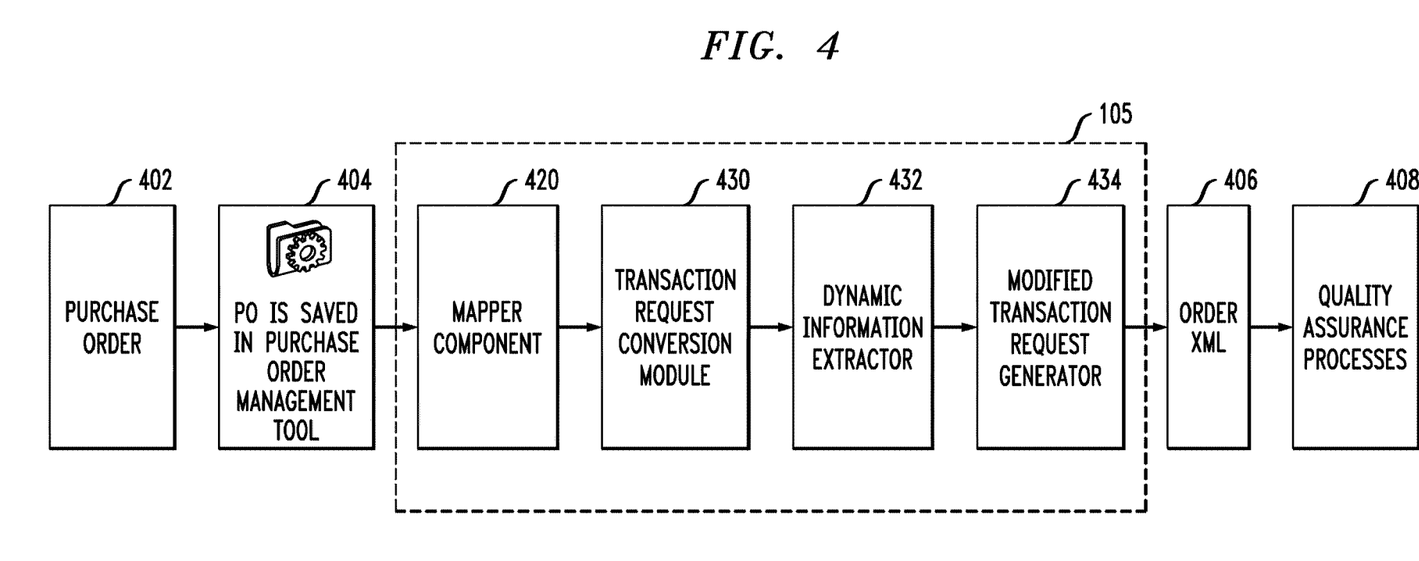
FIG. 4 shows a block diagram illustrating an example embodiment of the invention.

FIG. 4 shows a block diagram illustrating an example embodiment of the invention. By way of illustration, FIG. 4 depicts a (hard copy) PO 402 submitted via fax and/or email, which is then saved in a POM tool 404. An example instance of dynamic transaction request generation system 105 can then access the PO 402 in the POM tool 404, and mapping component 420 can perform account and/or segment-level OCR mapping based on the determined type of PO template and/or layout associated with PO 402. With respect to mapping component 420, based on the region and/or language and customer information identified in the PO 402, at least one embodiment of the invention can include determining where the information needs to be extracted and mapped to a corresponding output structure that can be subsequent sent to order processing. An example instance of transaction request conversion module 430 can perform OCR conversion (such as image/PDF to text conversion), parse one or more PO details from the OCR output, and convert the parsed details to an (online) XML format.

As also depicted in FIG. 4, an example instance of dynamic information extractor 432 can perform one or more post-processing steps as well as PO validation. Post-processing can include normalization of the data being extracted, verification of data and information that was extracted from the document (for example, quote number patterns, address patterns, item description information, etc.), ensuring that the pricing and quantity information on the document is accurate and extracted correctly, addition and removal of items from the quote based on information in the PO, etc. Additionally, an example instance of modified transaction request generator 434 provides a machine learning business intelligence layer which can auto-correct and/or update incorrect and/or missing information from the converted PO based on the customer's historical orders. The dynamic transaction request generation system 105 can then output an order XML 406 to a global commerce management (GCM) entity/component. Also, in the example embodiment depicted in FIG. 4, one or more quality assurance processes 408 can be applied to the order XML output 406.

In one or more embodiments of the invention, an order XML output, such as depicted as output 406 in FIG. 4, can additionally include a smart swap configuration and/or a smart swap address (such as detailed above). In such an embodiment, an online and/or automated processing system can then process the order XML per the smart swap configuration and/or address.

Figure 5:
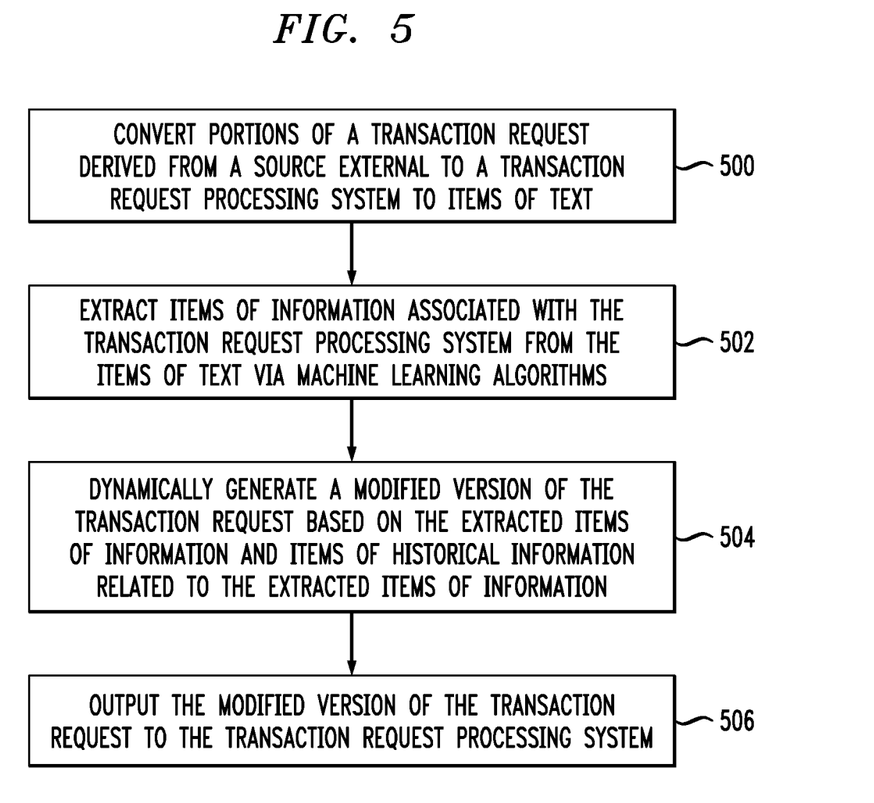
FIG. 5 is a flow diagram of a process for automated processing of offline orders using machine learning in an illustrative embodiment.

FIG. 5 is a flow diagram of a process for automated processing of offline orders using machine learning in an illustrative embodiment. It is to be understood that this particular process is only an example, and additional or alternative processes can be carried out in other embodiments.

In this embodiment, the process includes steps 500 through 506. These steps are assumed to be performed by the processor 120 utilizing its modules 130, 132, and 134.

Step 500 includes converting one or more portions of a transaction request to one or more items of text, wherein the transaction request is derived from a source external to a transaction request processing system. Step 500 can be carried out, for example, by transaction request conversion module 130, as illustrated in the FIG. 1 embodiment of the invention. Converting the one or more portions of the transaction request to one or more items of text can include applying one or more optical character recognition techniques to at least the one or more portions of the transaction request. Additionally, the one or more portions of the transaction request can include one or more images of textual input. Also, the source external to a transaction request processing system can include, for example, a facsimile source and/or an email source.

Converting the one or more portions of the transaction request to one or more items of text can also include automatically converting the one or more portions of the transaction request to one or more items of text in a commerce extensible markup language format. Further, the one or more items of text can include, for example, one or more items of text indicating one or more customer numbers, stock keeping unit information, one or more shipping methods, and/or one or more product identification numbers.

Step 502 includes extracting one or more items of information associated with the transaction request processing system from the one or more items of text via one or more machine learning algorithms. Step 502 can be carried out, for example, by dynamic information extractor 132, as illustrated in the FIG. 1 embodiment of the invention. The one or more items of information can include one or more items of information required by the transaction request processing system for processing a transaction request. Additionally, the one or more items of information can include one or more items of code information specific to at least one of an entity submitting the transaction request and the transaction request processing system. Also, one or more embodiments of the invention can include retrieving one or more items of historical information from a database related to the transaction request processing system based on the one or more items of extracted code information.

Step 504 includes dynamically generating a modified version of the transaction request based at least in part on the one or more extracted items of information and one or more items of historical information related to the one or more extracted items of information, wherein the modified version of the transaction request is compatible with the transaction request processing system. Step 504 can be carried out, for example, by modified transaction request generator 134, as illustrated in the FIG. 1 embodiment of the invention. The one or more items of historical information can include one or more items of historical information specific to at least one entity identified in the transaction request. Also, generating the modified version of the transaction request can include mapping the one or more items of historical information to the one or more extracted items of information. Further, generating the modified version of the transaction request can include populating a template specific to the transaction request processing system with the one or more extracted items of information and the one or more items of historical information.

Step 506 includes outputting the modified version of the transaction request to the transaction request processing system. Step 506 can be carried out, for example, by modified transaction request generator 134, as illustrated in the FIG. 1 embodiment of the invention. The techniques depicted in FIG. 5 can also include enabling manual validation of the one or more items of text by one or more users via a user interface and/or enabling manual updating of the modified version of the transaction request by one or more users via a user interface.

Accordingly, the particular processing operations and other network functionality described in conjunction with the flow diagram of FIG. 5 are presented by way of illustrative example only, and should not be construed as limiting the scope of the invention in any way. Alternative embodiments can use other types of processing operations to detect session-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of session-based anomaly detection for different user identifiers.

The above-described illustrative embodiments provide significant advantages relative to conventional approaches. For example, some embodiments can be configured to process externally-originating transaction requests in an automated fashion and automatically replacing out-of-stock and/or end-of-life products. These and other embodiments can effectively reduce operating expenses related to processing transaction requests, and improve efficiency of the delivery of solutions to customers.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
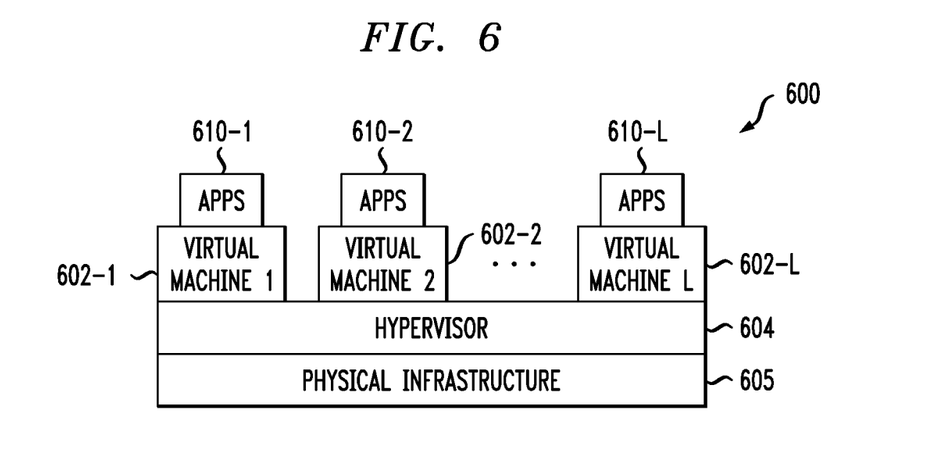
FIGS. 6 and 7 show examples of processing platforms that may be utilized to implement at least a portion of an information processing system in illustrative embodiments.
Figure 7:
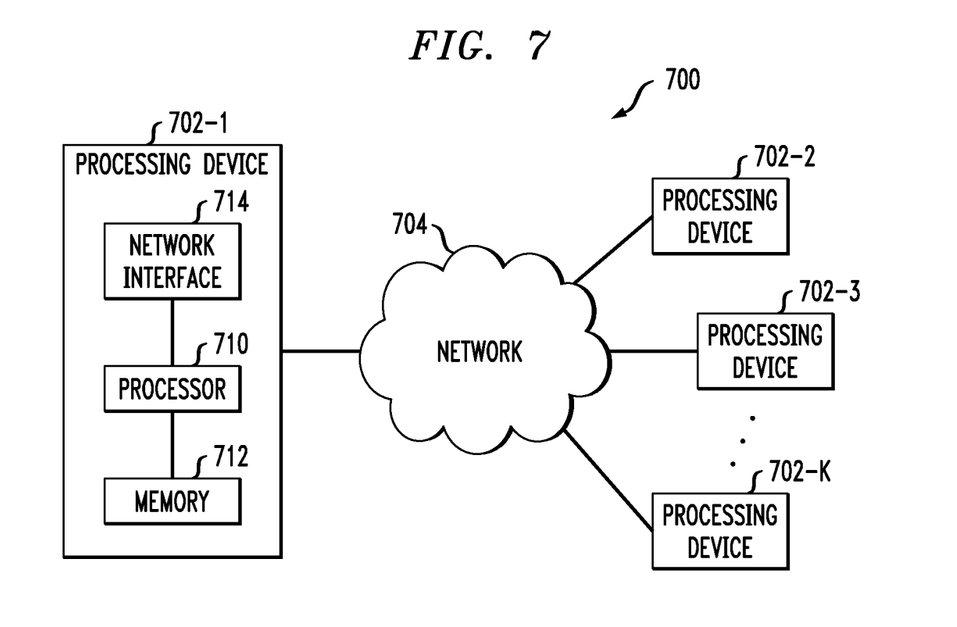

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises VMs 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide automated online processing of offline purchase orders. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising steps of:
    converting one or more portions of a transaction request to one or more items of text, wherein the transaction request is derived from a source external to a transaction request processing system;
    extracting one or more items of information associated with the transaction request processing system from the one or more items of text via one or more machine learning algorithms;
    dynamically generating a modified version of the transaction request based at least in part on the one or more extracted items of information and one or more items of historical information related to the one or more extracted items of information, wherein the modified version of the transaction request is compatible with the transaction request processing system and wherein dynamically generating the modified version of the transaction request comprises automatically performing one or move validation operations on the modified version of the transaction request by analyzing the modified version of the transaction request with respect to multiple validation points and updating, based at least in part on related historical transaction data, at least a portion of the modified version of the transaction request responsive to the analysis with respect to the multiple validation points; and
    outputting the modified version of the transaction request to the transaction request processing system;
    wherein the steps are performed by at least one processing device comprising a processor coupled to a memory.

2. The computer-implemented method of claim 1, further comprising enabling manual validation of the one or more items of text by one or more users via a user interface.

3. The computer-implemented method of claim 1, further comprising enabling manual updating of the modified version of the transaction request by one or more users via a user interface.

4. The computer-implemented method of claim 1, wherein converting the one or more portions of the transaction request to one or more items of text comprises applying one or more optical character recognition techniques to at least the one or more portions of the transaction request.

5. The computer-implemented method of claim 1, wherein the one or more portions of the transaction request comprise one or more images of textual input.

6. The computer-implemented method of claim 1, wherein the source external to a transaction request processing system comprises at least one of a facsimile source and an email source.

7. The computer-implemented method of claim 1, wherein converting the one or more portions of the transaction request to one or more items of text comprises automatically converting the one or more portions of the transaction request to one or more items of text in a commerce extensible markup language format.

8. The computer-implemented method of claim 1, wherein the one or more items of text comprises one or more items of text indicating at least one of one or more customer numbers, stock keeping unit information, one or more shipping methods, and one or more product identification numbers.

9. The computer-implemented method of claim 1, wherein the one or more items of information comprises one or more items of information required by the transaction request processing system for processing a transaction request.

10. The computer-implemented method of claim 1, wherein the one or more items of information comprises one or more items of code information specific to at least one of an entity submitting the transaction request and the transaction request processing system.

11. The computer-implemented method of claim 10, further comprising retrieving the one or more items of historical information from a database related to the transaction request processing system based on the one or more items of extracted code information.

12. The computer-implemented method of claim 1, wherein the one or more items of historical information comprise one or more items of historical information specific to at least one entity identified in the transaction request.

13. The computer-implemented method of claim 1, wherein generating the modified version of the transaction request comprises mapping the one or more items of historical information to the one or more extracted items of information.

14. The computer-implemented method of claim 1, wherein generating the modified version of the transaction request comprises populating a template specific to the transaction request processing system with the one or more extracted items of information and the one or more items of historical information.

15. A non-transitory processor-readable storage medium having stored therein program code of one or more software programs, wherein the program code when executed by at least one processing device causes said at least one processing device:

to convert one or more portions of a transaction request to one or more items of text, wherein the transaction request is derived from a source external to a transaction request processing system;

to extract one or more items of information associated with the transaction request processing system from the one or more items of text via one or more machine learning algorithms;

to dynamically generate a modified version of the transaction request based at least in part on the one or more extracted items of information and one or more items of historical information related to the one or more extracted items of information, wherein the modified version of the transaction request is compatible with the transaction request processing system, and wherein dynamically generating the modified version of the transaction request comprises automatically performing one or move validation operations on the modified version of the transaction request by analyzing the modified version of the transaction request with respect to multiple validation points and updating, based at least in part on related historical transaction data, at least a portion of the modified version of the transaction request responsive to the analysis with respect to the multiple validation points; and to output the modified version of the transaction request to the transaction request processing system.

16. The non-transitory processor-readable storage medium of claim 15, wherein the program code further causes said at least one processing device:

to enable manual validation of the one or more items of text by one or more users via a user interface.

17. The non-transitory processor-readable storage medium of claim 15, wherein the program code further causes said at least one processing device:

to enable manual updating of the modified version of the transaction request by one or more users via a user interface.

18. An apparatus comprising:

at least one processing device comprising a processor coupled to a memory;

said at least one processing device being configured:

to convert one or more portions of a transaction request to one or more items of text, wherein the transaction request is derived from a source external to a transaction request processing system;

to extract one or more items of information associated with the transaction request processing system from the one or more items of text via one or more machine learning algorithms;

to dynamically generate a modified version of the transaction request based at least in part on the one or more extracted items of information and one or more items of historical information related to the one or more extracted items of information, wherein the modified version of the transaction request is compatible with the transaction request processing system, and wherein dynamically generating the modified version of the transaction request comprises automatically performing one or move validation operations on the modified version of the transaction request by analyzing the modified version of the transaction request with respect to multiple validation points and updating, based at least in part on related historical transaction data, at least a portion of the modified version of the transaction request responsive to the analysis with respect to the multiple validation points; and to output the modified version of the transaction request to the transaction request processing system.

19. The apparatus of claim 18, wherein the at least one processing device is further configured:

to enable manual validation of the one or more items of text by one or more users via a user interface.

20. The apparatus of claim 18, wherein the at least one processing device is further configured:

to enable manual updating of the modified version of the transaction request by one or more users via a user interface.

* * * * *